May 8, 1951     J. W. COLE     2,552,477
TEMPERATURE TIME INTEGRATOR
Filed June 5, 1946
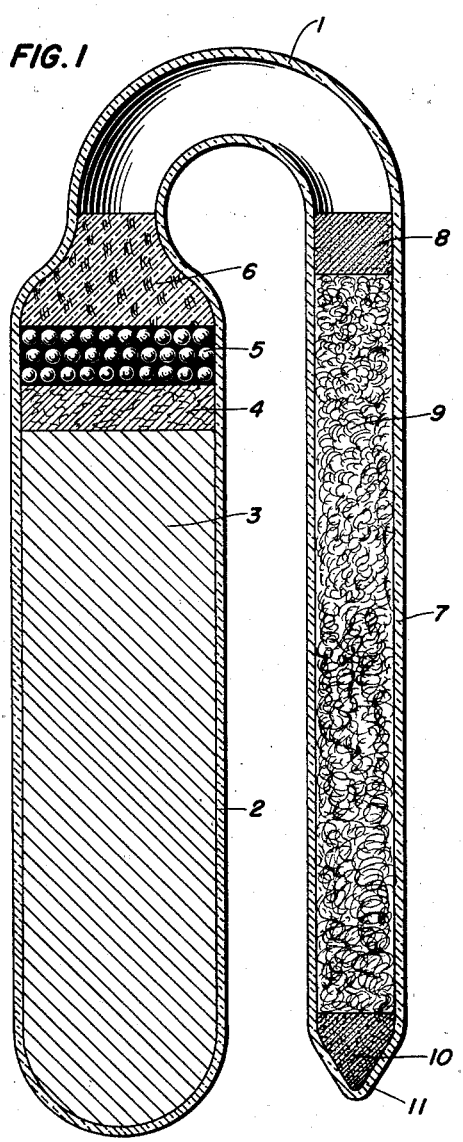
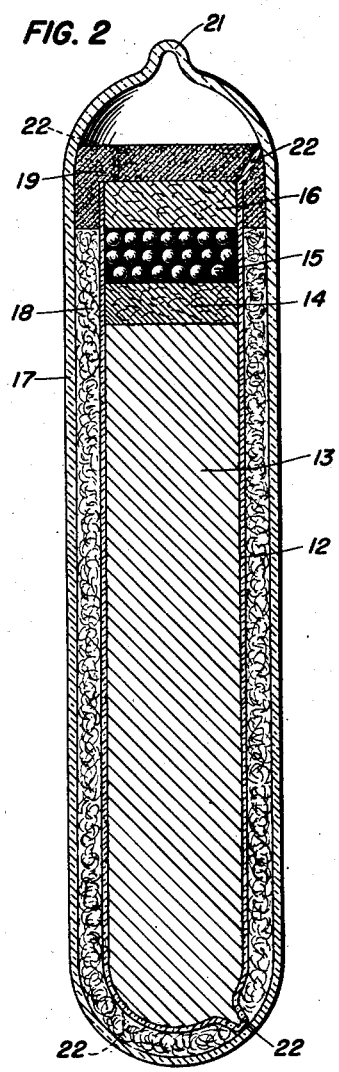
INVENTOR
JAMES W. COLE
BY
ATTORNEY Patented May 8, 1951

2,552,477

UNITED STATES PATENT OFFICE 2,552,477

TEMPERATURE TIME INTEGRATOR

James Webb Cole, Charlottesville, Va., assignor to the United States of America as represented by the Secretary of the Navy Application June 5, 1946, Serial No. 674,616

7 Claims. (Cl. 73—193)

The present invention relates to temperature-time integration.

More specifically, it relates to a process of and means for indicating the probable condition of articles that may deteriorate with time and on exposure to heat.

A particular object is to provide means for estimating the condition of electric cells or batteries.

In one form of the invention, an indicator is stored with the articles to be judged, so as to be subjected to the same aging influences of time and temperature as the articles.

A convenient indicator is one depending on chemical action, as, for example, the progressively spreading change of color of a material when subjected to the influence of a gas or other chemical agent.

While the invention, in its broader aspect, is independent of apparatus, two convenient devices embodying it are disclosed herein for illustrative purposes.

In the accompanying drawings:

Fig. 1 is a sectional diagram of a U-tube indicator.

Fig. 2 is a sectional diagram of a more compact alternative type.

With reference to Fig. 1, an inverted glass U-tube 1 has an enlarged arm 2, containing a material 3 that will liberate an efflux of any kind, such as gas, water vapor, or colloidally fine particles of a liquid or solid. Examples of such material will be given hereinafter.

A retaining plug 4 of any suitable fibrous material, not appreciably affected by the substances involved, covers the material 3. On top of the plug 4 is a plug 5 of coarsely porous nature, such as a quantity of glass beads or other material not deleterious to the said efflux. An additional plug 6, which may consist of a wad of fabric such as woven glass, for example, is placed over the plug 5. The tube 1 is constricted beginning at the portion containing the plug 6 and continues to form the other arm 7 of the tube.

This other, smaller arm 7 of the U-tube, first has a porous plug 8 inserted therein near the top. Below this is a filling of a sensitive agent 9, and finally a plug 10 at the bottom to hold the column 9 in place. The plugs 8 and 10 may be wads of glass fabric or of glass wool, for convenience, but any other suitable pervious material, substantially inert to the contents of the U-tube, will serve. The arm 7 is sealed at 11, after filling.

The embodiment of Fig. 2 is essentially similar in nature to that of Fig. 1, but physically is more compact and consequently more rugged.

It comprises a centrally located container 12, having a closed bottom and open top, and which may conveniently be made of glass. It contains a filling 13 of efflux-producing material, held in place by a plug 14 similar to the plug 4 and a filling 15 of beads, held in place by a fibrous plug 16. An outer transparent container 17 is spaced from the inner container 12.

A sensitive agent 18, in this form, is enclosed in the outer transparent container 17 and held in place by a porous plug 19. The outer tube may be drawn together and sealed, as shown at 21. A plurality of teats or projections 22 may be provided at the ends of the container 12, to assist in holding it concentrically in place in the outer container 17.

It should be understood that, if preferred, the contents and functions of the containers 12 and 17 may be interchanged, so that the inner tube will house the indicator 18. In such case, it is obvious that the level of filling of the outer container must be low enough, or a clear space left, on one side, to afford a view of the inner indicator.

The efflux-producing material used in either form of apparatus may be of various chemical natures. A preferred one consists of a mixture of solid ammonium chloride and solid barium hydroxide. The mixture slowly evolves ammonia. While certain other oxides or hydroxides also liberate ammonia when in contact with an ammonium salt, this particular mixture is desirable because of the suitably low rate at which the reaction proceeds, commensurate with the rate of aging of the battery cells to be indicated.

Ammonia gas is an efflux suitable for changing colors of many compounds of metals, by forming metal-ammonia compounds, for example:

| Indicator | Color Change |
|---|---|
| Cupric chloride | green-yellow to blue. |
| Nickel chloride | yellow to blue-violet. |
| Cobalt chloride | pink to blue-violet. |
| Cobalt bromide | pink-red to blue-violet. |

These sensitive chemicals, called indicators herein for brevity, may suitably be deposited on granules of silica gel, 18–20 mesh, as, for instance, by applying a solution of the indicator to the gel, and drying.

While ammonia is a convenient efflux for producing the color change, water vapor is also suitable, and may, of course, be obtained from a very large number of substances. Some results with water vapor are as follows:

| Indicator | Color Change |
| --- | --- |
| Cupric chloride (anhydrous) | yellow to blue-green. |
| Nickel chloride (anhydrous) | Do. |
| Cobalt bromide (anhydrous) | blue-green to red-pink. |
| Cobalt chloride (anhydrous) | blue to pink. |

It may also be mentioned that many amines, such as methyl amine, also produce color changes with many metal compounds. It would be necessary, of course, to use an amine that is sufficiently volatile to diffuse through the apparatus. Two possibilities are suggested: (1) an amine of volatility characteristics that are commensurate with the object of the aging tests; (2) a mixture of an amine salt, such as methyl amine hydrochloride, and a hydroxide such as barium hydroxide, would slowly liberate methyl amine.

A still different type of action is obtained by employing mercury vapor as the efflux, and palladous chloride as the indicator, whereupon the color change is from light yellow to black.

In order to provide an effective indicator, it is clear that the efflux should be substantially fully absorbed by the sensitive agent upon contact, so that a relatively sharp line of demarcation will appear between the unaltered remaining column of agent, and the end portion that has been changed in color.

Obviously, the extent to which the color change progresses is determined by the amount of efflux produced and by the cross-sectional area of the sensitive agent, and, therefore, variations may be provided by suitable changes in the relative amounts of the respective materials, and in the cross-section of the column of sensitive agent.

Tests were made of a device like that shown in Fig. 1, wherein the indicator was cobalt bromide deposited on granules of purified silica gel, 18-20 mesh; and the active constituent, that yielded the efflux, in this instance gaseous ammonia, was a mixture of solid ammonium chloride and solid barium hydroxide.

This mixture formed a column .56" in diameter and 1.5" long, in the larger-diameter arm of the U tube. The smaller arm was 0.3" bore, which was occupied by a column of the indicator, with suitable porous plugs of glass wool and glass beads arranged as shown in Fig. 1 of the drawing. Preliminary tests, made with various lengths and bores of the connecting tube between the mixture and the indicator, showed that for any length of connection even very much greater than any that would reasonably be considered, no difficulty or inaccuracy was introduced, as the efflux was capable of diffusing at a rate far exceeding its necessarily relatively low rate of emanation from the mixture.

The surface of demarcation between the unaltered indicator and the affected portion thereof was sensibly a plane normal to the axis of the column and was fairly sharply defined, with a very short zone of transition colors between the original red and the final deep blue. The exact location of the end of the blue column could therefore be marked on the outside of the tube, as by an ink mark or a piece of paper or adhesive tape applied to the tube.

Quantitative results, obtained by measuring the change of position of this blue coloration, are given below:

| Time, Days (24 hr.) | Height of Color Change in mm. at— | | |
| --- | --- | --- | --- |
| | 4° C. | 27° C. | 43° C. |
| 0 | 0 | 0 | 0 |
| 5 | 0 | 3.6 | 7.3 |
| 10 | 0.1 | 7.2 | 13.5 |
| 15 | 0.1 | 10.0 | 19.5 |
| 20 | 0.2 | 12.0 | 25.0 |
| 25 | 0.3 | 14.0 | 32.0 |
| 30 | 0.4 | 16.0 | 39.0 |
| 35 | 0.4 | 18.0 | 46.0 |

The information thus gained may be applied directly to the desired purpose of indicating the condition of certain perishable articles that age more rapidly as the temperature increases, for example, dry cells. The accelerated rate of aging of such cells, when heated, is well known to battery manufacturers and others who are interested therein, and it has been found that the rate of evolution of ammonia by the mixture closely parallels the rate of aging or deterioration of such dry cells, when subjected to similar temperatures. Hence, by storing an indicating device according to the present invention in the same package with the freshly made cells, and marking the location of the plane of demarcation on the indicator, at the time of packaging the cells, it will be known that if the said plane has progressed, say, one inch the condition of the cells is somewhat questionable, while if it has progressed one and one-half inches the cells have deteriorated to such extent that they should be discarded. It is of course not possible to state offhand just what correlation exists between any make and size of dry cell and the corresponding rate of color change, but having once determined this for any given brand and size, the information may be used with confidence for future shipments of the same kind of cell.

In use, the freshly made device is stored with the freshly made cells to be tested, so that it will be subjected to the same aging influences. The device may be calibrated to produce a definite known rate of travel of the discoloration, such that when the line of demarcation has passed a certain limit, the cells will be considered too near exhaustion to be serviceable, and it will thus serve to show whether or not a certain shipment of such cells is still fit for use.

In the appended claims, the term efflux is to be understood to signify any product evolved from the material that is of such nature that it may travel or diffuse away therefrom to reach the indicator, whether it be a gas or vapor or a colloidal liquid or colloidal solid, such as is commonly called a mist, fog, or smoke. The expression "aeriform efflux" is used to designate a true gas and/or vapor.

I claim:

1. A device for integrating a function of temperature with respect to time, which consists of a sealed container having a translucid portion, a dry composition including barium hydroxide mixed with an ammonium salt within the container, said composition evolving ammonia at a rate determined by the total amount of the composition and by the temperature to which it is subjected, and a column of indicator that changes color in response to ammonia, and also within the container, and having only one end exposed directly to the atmosphere within said container, said indicator being visible through said translucid portion, and located and exposed to be affected progressively from said exposed end of the column toward the other by said ammonia, to give a quantitative indication thereof.

2. A time and temperature integrating device consisting of a sealed translucid container having two distinct but communicating parts, one of said parts containing a dry mixture of ammonium chloride and barium hydroxide, and the other containing a column of a chemical indicator that changes its color upon exposure to ammonia, said column being so confined that the ammonia evolved from the mixture has direct access to only one end thereof.

3. An apparatus for use in determining the condition of material subject to aging by time and heat, which comprises a closed container containing a composition that yields an efflux, said composition being of such amount and so chosen that the rate of production of said efflux is approximately proportional to the rate at which the said material ages, and a chemical indicator reactive therewith and progressively accessible to the efflux, and showing by the extent of a resulting change in its appearance the total amount of efflux said composition has evolved, whereby the appearance of the indicator within the apparatus, when said apparatus has been stored with the material to be judged, will provide an approximate indication of the condition of the said material at any time.

4. An apparatus for use in determining the condition of an article subject to deterioration by age and heat, which comprises an enclosure containing a composition that continuously evolves an efflux at a rate affected by temperature, said composition being so chosen that the said rate is approximately a measure of the aging effect of heat on the article, and means in contact with and quantitatively responsive to the efflux for indicating the total amount that has been evolved at any time, whereby the apparatus, when stored adjacent the article to be judged and thus subjected to the same time and temperature conditions as the said article, will afford an indication of the approximate condition of the said article.

5. An apparatus, comprising a sealed vessel containing a dry composition for evolving ammonia, at a rate that is negligible at temperatures below 0° C. and that increases with temperature, and an indicator within the said vessel and exposed at one end only to the said ammonia, said indicator comprising a column of cupric chloride, which upon reacting with the ammonia will change from its original color to a deep blue color.

6. A time and temperature integrating device comprising two communicating vessels sealed against the outer atmosphere, the first vessel containing a dry mixture of barium hydroxide and an ammonium salt, and the second vessel being relatively long compared to its cross sectional area of bore and containing a dry chemical indicator including cupric chloride, formed into a column by said second vessel, whereby one end of said column is relatively nearer the first vessel than the other end of said column, and whereby also said column of indicator will be progressively deepened in color from said nearer end to its remote end as ammonia is progressively evolved by said mixture and absorbed by said indicator, said second vessel being at least in part translucid whereby said indicator color may be seen therethrough.

7. A time and temperature integrating device as defined in claim 6, wherein the indicator comprises cupric chloride deposited on granules of silica gel.

JAMES WEBB COLE.

REFERENCES CITED

The following references are of record in the file of this patent:

UNITED STATES PATENTS

| Number | Name | Date |
|---|---|---|
| 1,021,058 | Machlett | Mar. 26, 1912 |
| 1,321,062 | Lamb et al. | Nov. 4, 1919 |
| 1,777,353 | Davis | Oct. 7, 1930 |
| 2,046,863 | Allphint | July 7, 1936 |
| 2,111,301 | Schroter | Mar. 15, 1938 |
| 2,174,349 | Littlefield | Sept. 26, 1939 |

FOREIGN PATENTS

| Number | Country | Date |
|---|---|---|
| 345,672 | Great Britain | Mar. 23, 1931 |
| 478,140 | Great Britain | Jan. 10, 1938 |

OTHER REFERENCES

Mellor: "Comp. Treatise on Inorg. Chem.," vol. 15, p. 663, lines 21 to 24, Longmans, Green and Co., 1936.